Patented July 19, 1949

2,476,676

UNITED STATES PATENT OFFICE 2,476,676

CADMIUM PHOSPHATE PHOSPHORS

Alfred H. McKeag and Peter W. Ranby, North Wembley, England, assignors to General Electric Company, a corporation of New York No Drawing. Application May 31, 1944, Serial No. 539,814. In Great Britain August 6, 1943

2 Claims. (Cl. 252—301.6)

This invention relates to electric discharge lamps and devices with associated luminescent materials or phosphors excitable by the discharge or rays in the devices, and particularly to luminescent materials which are also phosphorescent. For present purposes, such a material may be considered phosphorescent if, when it is used as the luminescent material in a fluorescent lamp operated on 50 cycle A. C., the flicker is appreciably less than if a luminescent material were used which has no appreciable phosphorescence, e. g., magnesium tungstate. This probably means that the period of decay between the cessation of excitation and the instant when the phosphorescent light has decreased to half of its initial value considerably or substantially exceeds $10^{-4}$ sec. One aim of the invention is to provide phosphorescent materials that are excitable by 2537 Å. radiation (or, in practice, by the low pressure positive column mercury vapor discharge of an ordinary fluorescent lamp), and yield blue phosphorescent light when so excited; but the invention is not confined to material yielding blue phosphorescence. The invention also relates to the manufacture of phosphorescent materials, as well as to combinations of such materials with electrical exciting means, such as fluorescent lamps and cathode ray tubes, such phosphorescent materials being also excitable by cathode rays.

We have found that a phosphorescent phosphor such as here referred to can be obtained by activating cadmium phosphate with lead, and with manganese also as an associated supplemental or cooperating activator, if desired. In the absence of the lead, the manganese produces little or no phosphorescence in cadmium phosphate; but associated with lead serving as primary activator, manganese generally makes the phosphorescent light redder, though it is apt to decrease the intensity or the duration of the phosphorescence or both. Only minor percentages of lead or of manganese are necessary. Also, the presence of a little fluorine in the phosphor may increase the phosphorescence. Appreciable benefit can be obtained with an amount of fluorine which is not only a minor percentage of the phosphor, but substantially less than would be called for by a typical apatite formula such as $3Cd_3(PO_4)_2 \cdot 1CdF_2$, or even but a minor fraction of this amount.

A material phosphorescing under 2537 Å. excitation may be prepared according to the invention by heating material comprising as essential elements cadmium, phosphorus and oxygen (preferably combined, and preferably in the form of the radical —$PO_4$), lead, and possibly also manganese or fluorine, or both. Temperatures of heating of the order of 700° C. and 1000° C. have been found suitable, and temperatures within this range are at present preferred. As already intimated, it is believed that the material according to the invention has a matrix with the lattice structure of some cadmium phosphate, although its utility does not of course depend on the correctness of this view. Certain methods of preparing phosphorescent material according to the invention will now be described by way of example; these methods involve heating cadmium phosphate with a lead compound, which may conveniently be lead phosphate or nitrate, for instance. The ingredients or reagents employed should all be of the highest commercial purity, or of the high purity commonly used in preparing luminescent materials.

Precipitated cadmium phosphate may be prepared as follows:

Dissolve 956 g. cadmium sulphate $$3CdSO_4 \cdot 8H_2O$$

in 2500 ml. of hot distilled water to form solution A, and dissolve 320 g. diammonium-hydrogen phosphate in 1250 ml. of hot distilled water to form solution B. Add 10 ml. of solution A to solution B, and vice versa; filter each of the solutions, and mix the filtrates together. After being separated off, the resulting precipitate is washed six times with hot distilled water, dried at 120° C., and ground.

Precipitated lead phosphate may be prepared as follows:

Dissolve 189 g. lead acetate in 500 ml. of hot distilled water to form solution C, and dissolve 44 g. diammonium-hydrogen phosphate in 250 ml. of hot distilled water to form solution D. Add 10 ml. of solution C to solution D, and vice versa; filter each of the solutions, and mix the filtrates together. After being filtered off, the resulting precipitate is washed six times with hot distilled water, dried at 160° C., and ground.

Manganese phosphate can be prepared in a manner analogous or essentially similar to the preparation of cadmium and lead phosphates as hereinbefore described.

The following examples illustrate suitable proportions and procedure for preparing the phosphorescent luminescent material. In these examples, the proportions of lead in the prepared phosphor are stated without regard for any loss of lead by vaporization during the heating to form the phosphor; any such loss would correspondingly reduce the percentages of lead in the phosphor.

*Example 1.*—For a simple lead-activated cadmium phosphate phosphor, intimately mix 25 g. of cadmium phosphate with 0.16 g. lead phosphate (both preferably prepared as above), and heat the mixture for ½ hour at 800° C. in the air. When the product has cooled, grind it and heat it again at 800° C. for ½ hour. This final product may when cool be ground, washed, and sieved. It contains a percentage by weight of lead of the order of ½ percent or less, or of the order of a fraction of a per cent, in other words. Tested under the excitation of a low pressure mercury vapor discharge lamp with a quartz envelope (mainly by 2537 Å. radiation), it gives a blue phosphorescence.

*Example 2.*—For a similar lead-activated phosphor containing fluorine, the batch in Example 1 is modified by the inclusion of 2.5 g. of cadmium fluoride with the other ingredients when mixing them together before the first heating. Employing the same procedure and conditions as in Example 1, a final product is obtained which contains percentages by weight of lead and fluorine of the order of ½ per cent and 2½ per cent or less, in other words, of the order of a fraction of a per cent and two per cent, respectively. It has, again, a blue phosphorescence, but somewhat stronger.

*Example 3.*—For a lead-activated phosphor similar to that of Example 1 but also containing manganese as a supplemental, cooperating activator, the batch in Example 1 is modified by the inclusion of 0.75 g. of manganese phosphate (preferably prepared as above indicated) with the other ingredients when mixing them together before heating. Employing the same procedure and conditions as in Example 1, a final product is obtained which contains percentages by weight of lead and manganese of the order of ½ per cent and 1½ per cent or less, in other words, of the order of a fraction of a per cent and one per cent, respectively. It has a reddish phosphorescence.

It is not necessary, however, that lead and manganese (if present) should be introduced as phosphate: e. g., lead may be introduced as nitrate, and manganese as sulphate or chloride.

Obviously, when the phosphor is to contain fluorine in addition to both activators lead and manganese it is merely necessary to add to the batch in Example 1, both the cadmium fluoride of Example 2 and the manganese phosphate of Example 3.

What we claim as new and desire to secure by Letters Patent of the United States is:

1. A luminescent and phosphorescent material consisting essentially of cadmium phosphate activated with a fraction of a per cent of lead, and approximately two per cent of fluorine as cadmium fluoride, whereby the phosphorescence is increased.

2. A phosphorescent material consisting essentially of cadmium phosphate activated with a fraction of a per cent of lead and approximately 1 per cent of manganese, excitable by 2537 Å. radiation, and approximately 2 per cent of fluorine as cadmium fluoride, whereby the intensity of its phosphorescent afterglow is enhanced.

ALFRED H. McKEAG.
PETER W. RANBY.

REFERENCES CITED

The following references are of record in the file of this patent:

UNITED STATES PATENTS

| Number | Name | Date |
|---|---|---|
| 2,214,643 | McKeag | Sept. 10, 1940 |
| 2,220,894 | Einig | Nov. 12, 1940 |
| 2,226,407 | McKeag | Dec. 24, 1940 |
| 2,247,192 | Fonda | June 24, 1941 |

FOREIGN PATENTS

| Number | Country | Date |
|---|---|---|
| 512,154 | Great Britain | Aug. 30, 1939 |